United States Patent
Gao et al.

(10) Patent No.: US 9,654,770 B2
(45) Date of Patent: May 16, 2017

(54) METHOD AND APPARATUS FOR EVALUATING MEDIA QUALITY

(71) Applicant: HUAWEI TECHNOLOGIES CO.,LTD., Shenzhen, Guangdong (CN)

(72) Inventors: Shan Gao, Shenzhen (CN); Lina Sun, Shenzhen (CN); Qingpeng Xie, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 432 days.

(21) Appl. No.: 14/518,164

(22) Filed: Oct. 20, 2014

(65) Prior Publication Data
US 2015/0035996 A1 Feb. 5, 2015

Related U.S. Application Data

(63) Continuation of application No. PCT/CN2012/085710, filed on Dec. 2, 2012.

(30) Foreign Application Priority Data

May 28, 2012 (CN) .......................... 2012 1 0168687

(51) Int. Cl.
*G06F 15/16* (2006.01)
*H04N 17/00* (2006.01)
(Continued)

(52) U.S. Cl.
CPC ........... *H04N 17/004* (2013.01); *H04N 17/02* (2013.01); *H04N 19/89* (2014.11); *H04N 21/23418* (2013.01); *H04N 21/44008* (2013.01)

(58) Field of Classification Search
USPC ....... 709/203, 206, 217, 219, 223, 224, 226, 709/228, 232; 348/184; 375/240.01, (Continued)

(56) References Cited

U.S. PATENT DOCUMENTS 8,339,976 B2 * 12/2012 Gustafsson ........... G06T 7/0002
    348/184
8,761,243 B2 * 6/2014 Rose ................... H04N 21/234
    375/240.01
(Continued)

FOREIGN PATENT DOCUMENTS

CN    101635846 A    1/2010
CN    101998137 A    3/2011
(Continued)

OTHER PUBLICATIONS

"3rd Generation Partnership Project; Technical Specification Group Services and System Aspects; Transparent end-to-end packet switched streaming service (PSS); RTP usage model (Release 5)," 3GPP TR 26.937, V2.0.0, Sep. 2003, 38 pages.
(Continued)

*Primary Examiner* — Quang N Nguyen
(74) *Attorney, Agent, or Firm* — Slater Matsil, LLP

(57) ABSTRACT

In a method for evaluating media quality, media reference quality and rebuffering event distortion quality are obtained, final media quality are determined according to the obtained media reference quality and rebuffering event distortion quality, where a parameter of the rebuffering event distortion quality includes at least one of the following: the number of rebuffering events, a duration of the rebuffering event, a multiple rebuffering event interaction impact parameter, initial media quality, and a factor describing media content complexity. When media quality is calculated, impact of the multiple rebuffering event interaction impact parameter, the initial media quality, and the factor describing media content complexity on the media quality is considered, thereby making a media quality evaluation result more accurate.

13 Claims, 4 Drawing Sheets

Obtain media reference quality, packet loss distortion quality and rebuffering event distortion quality, where a parameter of the rebuffering event distortion quality includes at least one of the following: the number of rebuffering events, a time duration of the rebuffering event, a parameter affecting interaction between multiple rebuffering events, initial media quality, and a factor describing media content complexity — S301

Determine final media quality according to the obtained media reference quality, packet loss distortion quality, and rebuffering event distortion quality — S302

(51) Int. Cl.
*H04N 17/02* (2006.01)
*H04N 21/234* (2011.01)
*H04N 21/44* (2011.01)
*H04N 19/89* (2014.01)

(58) Field of Classification Search
USPC .............................................. 375/240.27; 1/1
See application file for complete search history.

(56) References Cited

U.S. PATENT DOCUMENTS

| | | | |
|---|---|---|---|
| 8,902,782 B2* | 12/2014 | Gustafsson | ............ H04N 17/00 |
| | | | 348/184 |
| 9,402,074 B2* | 7/2016 | Gao | ...................... H04N 19/154 |
| 9,419,875 B2* | 8/2016 | Gao | ........................ H04N 17/02 |
| 9,571,633 B2* | 2/2017 | Hardy | ............... H04L 29/06027 |
| 2003/0099298 A1* | 5/2003 | Rose | ................... H04N 21/234 |
| | | | 375/240.27 |
| 2008/0181221 A1 | 7/2008 | Kampmann et al. | |
| 2009/0244289 A1 | 10/2009 | Raake et al. | |
| 2010/0008241 A1 | 1/2010 | Gustafsson et al. | |
| 2011/0085605 A1 | 4/2011 | Xie et al. | |
| 2014/0232878 A1 | 8/2014 | Sun et al. | |
| 2015/0134771 A1* | 5/2015 | Kalman | .............. H04L 65/4069 |
| | | | 709/217 |

FOREIGN PATENT DOCUMENTS

| | | |
|---|---|---|
| JP | 2008537393 A | 9/2008 |
| JP | 2010507324 A | 3/2010 |
| KR | 1020060024733 A | 3/2006 |
| WO | 2008048155 A1 | 4/2008 |

OTHER PUBLICATIONS

Fezheng Yang et al:"No-Reference Quality Assessment for Networked Video via Primary Analysis of Bit Stream", XP011319799 ,Nov. 2010, total 12 pages.

Xiangchun Tan et al:"Perceived Video Streaming Quality under Initial Buffering and Rebuffering Degrations", XP055097502, Jun. 5, 2006, total 8 pages.

* cited by examiner

METHOD AND APPARATUS FOR EVALUATING MEDIA QUALITY

CROSS-REFERENCE TO RELATED APPLICATIONS

This application is a continuation of International Application No. PCT/CN2012/085710, filed on Dec. 2, 2012, which claims priority to Chinese Patent Application No. 201210168687.0, filed on May 28, 2012, both of which are hereby incorporated by reference in their entireties.

TECHNICAL FIELD

The present invention relates to the field of communications technologies, and in particular, to a method and an apparatus for evaluating media quality.

BACKGROUND

Video quality evaluation is an important technology that is indispensable for a video application. Video quality is affected by many complex factors, including: quality of service (for example, bandwidth, packet loss, latency, and jitter) of a transmission channel, and how parameters of video encoding and decoding ends match a transmission channel (for example, an encoding manner, a video resolution, a video frame rate, error resilience strength, or whether a buffer control policy of encoding and decoding ends is suitable). In addition to channel packet loss and an encoding manner that result in video data loss, thereby reducing video quality, video rebuffering or freezing or intermittent stop caused by channel latency and jitter can also seriously affect video quality.

Impact of encoding quality, video rebuffering, and network packet loss is considered in an existing video quality evaluation model:

$$TOT\_MOS_{pred} \text{func}(Qual_{encoding}, Qual_{buff}, Qual_{pl})$$

For the encoding quality, impact of a bit stream and an encoding format is considered.

$$Qual_{encoding} = c_0 - x_1 \cdot e^{-\lambda \cdot x}$$

$c_0$, $c_1$ and $\lambda$ are each a constant, and may be different values for different encoding formats.

Network packet loss quality is calculated by using a packet loss rate, where an average packet loss rate is first calculated within a sliding window:

$$PLR_{mean} = \frac{1}{N} \cdot \sum_{i=1}^{N} PLR_i$$

Maximum packet loss rates $PLR_u$ and $PLR_l$ are preset; if a packet loss rate within the sliding window is greater than $PLR_u$, it is considered that the quality is the worst; and if the packet loss rate is less than $PLR_l$, it is considered that the current packet loss does not affect video quality.

$$PLR_i = \min(PLR_i, PLR_u), \text{ and } PLR_i = \max(PLR_i, PLR_l)$$

Packet loss quality within a period of time is:

$$Qual_{pl} = const \cdot (Qual_{encoding} - 1) \cdot \xi + 1$$

$$\xi = \frac{PLR_u - PLR_{mean}}{PLR_u - PLR_l},$$

$$0 \leq \xi \leq 1$$

For the impact of video rebuffering, impact of the number of video rebufferings, a re-buffering duration, and an initial buffer duration within a period of time is considered. A model is as follows:

$$Qual_{buff} = C_0 + C_1 \cdot INIT\_PERC + C_2 \cdot BUF\_PERC + C_3 \cdot BUF\_FRQ$$

Final video quality is:

$$TOT\_MOS_{pred} = Qual_{pl} \cdot Qual_{buff}$$

In the prior art, during video quality evaluation, a multiple rebuffering event interaction impact parameter, impact of video content, and impact of initial video quality within a period of time are not considered. As a result, an existing video quality evaluation result is not sufficiently accurate and there is a gap between the video quality evaluation result and subjective feelings of people.

SUMMARY

Technical Problem

An objective of embodiments of the present invention is to provide a method for evaluating media quality, so as to solve a problem in the prior art that a result of existing video quality evaluation is inconsistent with the subjective feeling of people because a multiple rebuffering event interaction impact parameter, impact of media content, and impact of initial media quality within a period of time are not considered during video quality evaluation.

Technical Solution

The embodiments of the present invention are implemented in this way: a method for evaluating media quality, where the method includes:

obtaining media reference quality and rebuffering event distortion quality; and determining final media quality according to the obtained media reference quality and rebuffering event distortion quality, where a parameter of the rebuffering event distortion quality includes at least one of the following: the number of rebuffering events, a duration of the rebuffering event, a multiple rebuffering event interaction impact parameter, initial media quality, and a factor describing media content complexity.

A method for evaluating media quality, where the method includes:

dividing a to-be-evaluated media file into a plurality of evaluation segments;

obtaining media reference quality and rebuffering event distortion quality of each of the evaluation segments, where a parameter of rebuffering event distortion quality of the evaluation segments includes at least one of the following: the number of rebuffering events, a duration of the rebuffering event, a multiple rebuffering event interaction impact parameter, initial media quality, and a factor describing media content complexity;

calculating media quality of each of the evaluation segments according to the obtained media reference quality and rebuffering event distortion quality of each of the evaluation segments; and determining final quality of the media according to the media quality that is of each of the evaluation segments and obtained by calculation.

An embodiment of the present invention further provides an apparatus for evaluating media quality, where the apparatus includes:

an obtaining unit, configured to obtain media reference quality and rebuffering event distortion quality; and a determining unit, configured to determine final media quality according to the media reference quality and the rebuffering event distortion quality which are obtained by the obtaining unit, where a parameter of the rebuffering event distortion quality includes at least one of the following: the number of rebuffering events, a duration of the rebuffering event, a multiple rebuffering event interaction impact parameter, initial media quality, and a factor describing media content complexity.

An embodiment of the present invention further provides an apparatus for evaluating media quality, where the apparatus includes:

an evaluation segment dividing unit, configured to divide a to-be-evaluated media file into a plurality of evaluation segments;

an obtaining unit, configured to obtain media reference quality and rebuffering event distortion quality of each of the evaluation segments that is obtained by dividing by the evaluation segment dividing unit, where a parameter of rebuffering event distortion quality of the evaluation segments includes at least one of the following: the number of rebuffering events, a duration of the rebuffering event, a multiple rebuffering event interaction impact parameter, initial media quality, and a factor describing media content complexity;

a calculating unit, configured to calculate media quality of each of the evaluation segments that is obtained by dividing by the evaluation segment dividing unit according to the obtained media reference quality and rebuffering event distortion quality that are of each of the evaluation segments and obtained by the obtaining unit; and a determining unit, configured to determine final quality of the media according to the media quality that is of each of the evaluation segments and is obtained by calculating by the calculating unit.

Beneficial Effects

It can be learned from the foregoing technical solutions that when media quality is calculated in the embodiments of the present invention, impact of a multiple rebuffering event interaction impact parameter, initial media quality, and a factor describing media content complexity on the media quality is considered, thereby making a media quality evaluation result more accurate, and more consistent with subjective feelings of people.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention.

DESCRIPTION OF EMBODIMENTS

To make the objectives, technical solutions, and advantages of the present invention clearer and more comprehensible, the following further describes the present invention in detail with reference to the accompanying drawings and embodiments.

To better understand the embodiments of the present invention, some concepts that appear in the embodiments of the present invention are explained in the following:

Media reference quality is distortion caused due to media encoding compression and is basic quality when different media streams are encoded into different bit rates in the case of different encoding types.

Packet loss distortion is media frame (for example, a video frame and/or an audio frame) damage is resulted from delay packet loss that is caused by loss or jitter of a data packet of a media stream that is transmitted in a network channel, where bit error distortion and bit error transmission distortion are caused by frame damage, and a degree of distortion and a distortion value depend on the encoding basic quality.

A factor describing media content complexity represents description of complexity of media content from the perspective of time, space, or both time and space. For example, a video sequence that moves faster, or a video sequence that has more content details or richer colors has a greater factor describing video content complexity.

Rebuffering event: for a video sequence, impact of a rebuffering event is specifically presented as repeatedly displaying a previous displayed image, or continuous motionless images. For an audio sequence, impact of a rebuffering event is specifically presented as repeatedly playing audio of a previous frame/period of time, or being still without sound. For an audio-video sequence, impact of a rebuffering event is a combination of the foregoing two situations.

The embodiments of the present invention are applicable to quality evaluation of video rebuffering, audio rebuffering, and audio-video rebuffering. Media according to the embodiments of the present invention includes video, audio, or audio-video.

In a practical application, a rebuffering event and packet loss distortion may simultaneously or separately appear in media.

To describe the technical solutions of the present invention, descriptions are provided in the following by using specific embodiments.

Embodiment 1

Figure 1:
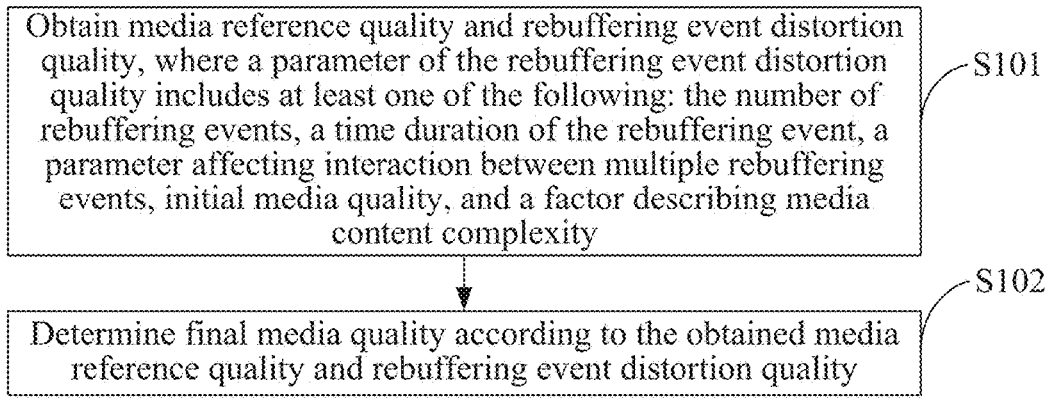
FIG. 1 is a flowchart of implementation of a method for evaluating media quality according to Embodiment 1 of the present invention.

FIG. 1 shows an implementation procedure of a method for evaluating media quality according to Embodiment 1 of the present invention, where a process of the method is described in detail as follows:

In step S101, obtain media reference quality and rebuffering event distortion quality.

In this embodiment, the media reference quality may be obtained by using the prior art, which is not described in detail again herein. A parameter of the rebuffering event distortion quality includes, but is not limited to, at least one of the following: the number of rebuffering events, a duration of the rebuffering event, a multiple rebuffering event interaction impact parameter, initial media quality, and a factor describing media content complexity. Alternatively, the parameter of the rebuffering event distortion quality includes, but is not limited to, at least one of the following: the multiple rebuffering event interaction impact parameter, the initial media quality, and the factor describing media content complexity.

Specifically, the parameter of the rebuffering event distortion quality includes the initial media quality, the number of rebuffering events, and the duration of the rebuffering events, where $Q_{rebuf}$=func(Video_Quality,Rebuf_Num,Rebuf_Len). Alternatively, the parameter of the rebuffering event distortion quality includes the initial media quality, the number of rebuffering events, the duration of the rebuffering events, and the multiple rebuffering event interaction impact parameter, where $Q_{rebuf}$=func(Video_Quality,Rebuf_Num,Rebuf_Len,MultiRebuf_Factor). $Q_{rebuf}$ represents the rebuffering event distortion quality, Video_Quality represents the initial media quality, Rebuf_Num represents the number of rebuffering events, Rebuf_Len represents the duration of the rebuffering events, and MultiRebuf_Factor represents the multiple rebuffering event interaction impact parameter.

Rebuf_Num=n, where n represents a total number of times the rebuffering events occur within a preset time.

When the duration of the rebuffering events is a weighted average duration of the rebuffering events within a preset time, the weighted average duration of the rebuffering events within the preset time is obtained according to a duration for which a rebuffering event lasts within the preset time and a weighting coefficient of the rebuffering event, where a specific calculation formula of the weighted average duration may be:

$$\text{Rebuf\_Len} = \frac{\sum_{i=1}^{n} W_i \cdot Len_i}{\sum_{i=1}^{n} W_i},$$

where n represents the total number of times the rebuffering events occur within the preset time, $Len_i$ represents a duration for which an $i^{th}$ rebuffering event lasts within the preset time, $W_i$ represents a weighting coefficient of the $i^{th}$ rebuffering event (where the weighting coefficient may be an equal constant, and may also be a weight that is set according to a rebuffering duration; and a longer rebuffering time indicates a greater weight, and vice versa), and Rebuf_Len represents the weighted average duration of the rebuffering events within the preset time.

Alternatively, the duration of the rebuffering events is a ratio of a total duration for which the rebuffering events last within the preset time to the preset time, where a specific calculation formula of the ratio may be:

$$\text{Rebuf\_Len} = \frac{\sum_{i=1}^{n} Len_i}{\text{Time}},$$

where n represents the total number of times the rebuffering events occur within the preset time, $Len_i$ represents the duration for which the $i^{th}$ rebuffering event lasts within the preset time, Time represents the preset time, and Rebuf_Len represents the ratio of the total duration for which the rebuffering events last within the preset time to the preset time.

Alternatively, the duration of the rebuffering events is the total duration for which the rebuffering events last within the preset time, where a specific calculation formula of the total duration may be:

$$\text{Rebuf\_Len} = \sum_{i=0}^{n} Len_i,$$

where n represents the total number of times the rebuffering events occur within the preset time, $Len_i$ represents the duration for which the $i^{th}$ rebuffering event lasts within the preset time, and Rebuf_Len represents the total duration for which the rebuffering events last within the preset time.

When the multiple rebuffering event interaction impact parameter is a weighted average duration of time intervals between rebuffering events within a preset time, the weighted average duration of the time intervals between the rebuffering events within the preset time is obtained according to a time interval between a rebuffering event and a previous rebuffering event of the rebuffering event within the preset time and a weighting coefficient of the rebuffering event, where a specific calculation formula of the weighted average duration may be:

$$\text{MultiRebuf\_Factor} = \frac{\sum_{i=1}^{n} M_i \cdot Interval_i}{\sum_{i=1}^{n} M_i},$$

where n represents the total number of times the rebuffering events occur within the preset time, $Interval_i$ represents a time interval between an $i^{th}$ rebuffering event and a previous rebuffering event of the $i^{th}$ rebuffering event within the preset time, for example, an interval between a start time of a current rebuffering event and an end time of a previous rebuffering event, $M_i$ represents a weighting coefficient (where the weighting coefficient may be an equal constant, and may also be a weight that is set according to a rebuffering time interval; and a longer duration indicates a greater weight, and vice versa) of the $i^{th}$ rebuffering event, and MultiRebuf_Factor represents the weighted average duration of the time intervals between the rebuffering events within the preset time.

In this embodiment, the weighting coefficient may also be set according to a preset rule, where the preset rule includes setting the weighting coefficient according to a length of a time interval between rebuffering events or setting the weighting coefficient according to the number of times rebuffering occurs within a same rebuffering time interval.

Figure 2:
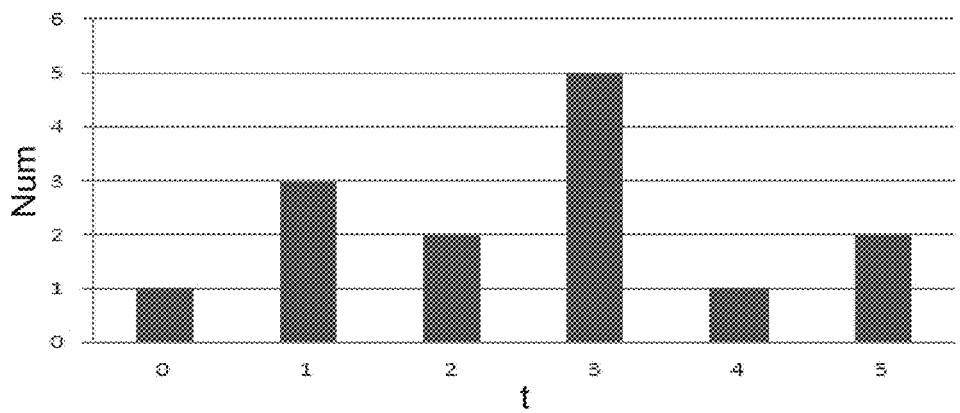
FIG. 2 is a histogram of rebuffering intervals according to Embodiment 1 of the present invention.

FIG. 2 is a histogram of the number of rebuffering interval times, where a lateral axis t represents a rebuffering interval length, that is, an interval between a start time of a current rebuffering event and an end time of a previous rebuffering event, a longitudinal axis Num represents the number of times rebuffering occurs within a same rebuffering time interval, $M_i$ may be set according to Num, and a greater Num indicates a greater weight.

In this embodiment, Video_Quality may be the media reference quality, and may also be media quality after packet loss distortion. In a same rebuffering event, if Video_Quality is higher, a greater extent to which quality deteriorates. When Video_Quality is the same, if Rebuf_Num, Rebuf_Len, or MultiRebuf_Factor is greater, impact on media quality is greater and the media quality deteriorates more greatly.

In this embodiment, the rebuffering event distortion quality may be obtained according to the initial media quality, the number of rebuffering events, and the duration of the rebuffering events, and the rebuffering event distortion quality is a linear, non-linear, or linear-nonlinear combination of Rebuf_Num, Rebuf_Len, and MultiRebuf_Factor, where a specific calculation formula of the rebuffering event distortion quality may be:

$$Q_{rebuf} = (\text{Video\_Quality} - MOS_{min}) \cdot \frac{\left(\frac{\text{Rebuf\_Len}}{a_1}\right)^{b_1} \cdot \left(\frac{\text{Rebuf\_Num}}{a_2}\right)^{b_2}}{1 + \left(\frac{\text{Rebuf\_Len}}{a_1}\right)^{b_1} \cdot \left(\frac{\text{Rebuf\_Num}}{a_2}\right)^{b_2}},$$

or $$Q_{rebuf} = (\text{Video\_Quality} - MOS_{min}) \cdot (a_1 \cdot \text{Rebuf\_Len}^{b_1} + c_1 \cdot \text{Rebuf\_Num}^{d_1}) \cdot (a_2 \cdot \text{Rebuf\_Len}^{b_2} + c_2 \cdot \text{Rebuf\_Num}^{d_2}),$$

or $$Q_{rebuf} = (\text{Video\_Quality} - MOS_{min}) \cdot \left( \frac{(a_1 \cdot \text{Rebuf\_Len}^{b_1} + c_1 \cdot \text{Rebuf\_Len}^{d_1} + e_1) \cdot (a_2 \cdot \text{Rebuf\_Num}^{b_2} + c_2 \cdot \text{Rebuf\_Len}^{d_2} + e_2)}{1 + (a_1 \cdot \text{Rebuf\_Len}^{b_1} + c_1 \cdot \text{Rebuf\_Len}^{d_1} + e_1) \cdot (a_2 \cdot \text{Rebuf\_Num}^{b_2} + c_2 \cdot \text{Rebuf\_Len}^{d_2} + e_2)} \right);$$

or the rebuffering event distortion quality is obtained according to the initial media quality, the number of rebuffering events, the duration of the rebuffering events, and the multiple rebuffering event interaction impact parameter, where a specific calculation formula of the rebuffering event distortion quality may be:

$$Q_{rebuf} = (\text{Video\_Quality} - MOS_{min}) \cdot \frac{\left(\frac{\text{Rebuf\_Len}}{a_1}\right)^{b_1} \cdot \left(\frac{\text{Rebuf\_Num}}{a_2}\right)^{b_2} \cdot \left(\frac{\text{MultiRebuf\_Factor}}{a_3}\right)^{b_3}}{1 + \left(\frac{\text{Rebuf\_Len}}{a_1}\right)^{b_1} \cdot \left(\frac{\text{Rebuf\_Num}}{a_2}\right)^{b_2} \cdot \left(\frac{\text{MultiRebuf\_Factor}}{a_3}\right)^{b_3}},$$

or $$Q_{rebuf} = (\text{Video\_Quality} - MOS_{min}) \cdot \frac{(a_1 \cdot \text{Rebuf\_Num}^{b_1} + c_1 \cdot \text{Rebuf\_Num}^{d_1} + e_1) \cdot (a_2 \cdot \text{Rebuf\_Len}^{b_2} + c_2 \cdot \text{Rebuf\_Num}^{d_2} + e_2) \cdot (a_3 \cdot \text{MultiRebuf\_Factor}^{b_3} + c_3 \cdot \text{MultiRebuf\_Factor}^{d_3} + e_3)}{1 + (a_1 \cdot \text{Rebuf\_Num}^{b_1} + c_1 \cdot \text{Rebuf\_Num}^{d_1} + e_1) \cdot (a_2 \cdot \text{Rebuf\_Len}^{b_2} + c_2 \cdot \text{Rebuf\_Num}^{d_2} + e_2) \cdot (a_3 \cdot \text{MultiRebuf\_Factor}^{b_3} + c_3 \cdot \text{MultiRebuf\_Factor}^{d_3} + e_3)},$$

or $$Q_{rebuf} = (\text{Video\_Quality} - MOS_{min}) \cdot (a_1 \cdot \text{Rebuf\_Num}^{b_1} + c_1 \cdot \text{Rebuf\_Num}^{d_1} + e_1) \cdot (a_2 \cdot \text{Rebuf\_Len}^{b_2} + c_2 \cdot \text{Rebuf\_Num}^{d_2} + e_2) \cdot (a_3 \cdot \text{Rebuf\_Interval}^{b_3} + c_3 \cdot \text{Rebuf\_Interval}^{d_3} + e_3) \cdot (a_4 \cdot \text{MultiRebuf\_Factor}^{d_4} + c_4 \cdot \text{MultiRebuf\_Factor}^{d_4} + e_4)$$

where Video_Quality is the initial media quality, $MOS_{min}$ represents lowest media quality (a constant greater than 0), Rebuf_Num represents the number of rebuffering events within an evaluation segment (a media sequence within a preset period of time), Rebuf_Len represents a duration for which the rebuffering events last within the evaluation segment, MultiRebuf_Factor represents a weighted average duration of time intervals between rebuffering events within a preset time, and $a_1$, $a_2$, $a_3$, $b_1$, $b_2$ are constants.

In step S102, determine final media quality $Q_v$=func($Q_{coding}$, $Q_{rebuf}$) according to the obtained media reference quality and rebuffering event distortion quality.

In this embodiment, a specific calculation formula of determining the final media quality according to the obtained media reference quality and rebuffering event distortion quality may be:

$Q_v = Q_{coding} - Q_{rebuf}$ where $Q_v$ represents the final media quality, $Q_{coding}$ represents the media reference quality, and $Q_{rebuf}$ represents the rebuffering event distortion quality.

Embodiment 2

Figure 3:
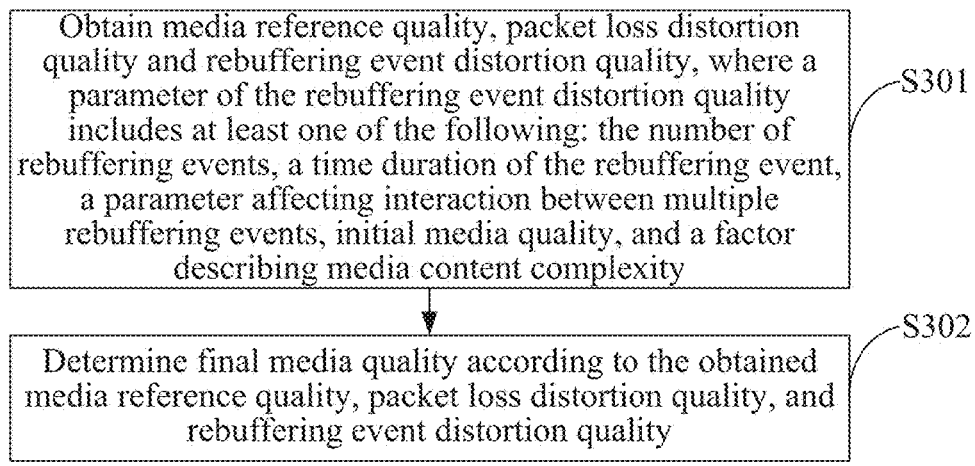
FIG. 3 is a flowchart of implementation of a method for evaluating media quality according to Embodiment 2 of the present invention.

FIG. 3 shows an implementation procedure of a method for evaluating media quality according to Embodiment 2 of the present invention, where a process of the method is described in detail as follows:

In step S301, obtain media reference quality, and obtain packet loss distortion quality and rebuffering event distortion quality.

In this embodiment, the media reference quality and the packet loss distortion quality may be obtained by using the prior art, which is not described in detail again herein. The rebuffering event distortion quality is obtained by using the method in Embodiment 1.

A parameter of the rebuffering event distortion quality includes at least one of the following: the number of rebuffering events, a duration of the rebuffering event, a multiple rebuffering event interaction impact parameter, initial media quality, and a factor describing media content complexity.

In step S302, determine final media quality $Q_v$=func($Q_{encoding}, Q_{pkt\_lost}, Q_{rebuf}$) according to the obtained media reference quality, packet loss distortion quality, and rebuffering event distortion quality.

In this embodiment, a specific calculation formula of determining the final media quality according to the obtained media reference quality, packet loss distortion quality, and rebuffering event distortion quality may be: $Q_v$=$Q_{encoding}, Q_{pkt\_lost}, Q_{rebuf}$, where $Q_{rebuf}$=($Q_{coding}$−$MOS_{min}$)·func(Rebuf_Num,Rebuf_Len,MultiRebuf_Factor), $Q_v$ represents the final media quality, $Q_{coding}$ represents the media reference quality, $Q_{pkt\_lost}$ represents the packet loss distortion quality, and $Q_{rebuf}$ represents the rebuffering event distortion quality.

Preferably, the initial media quality may further be calculated according to the obtained media reference quality and packet loss distortion quality, and the final media quality is determined according to the obtained rebuffering event distortion quality $Q_{rebuf}$=(Video_Quality−$MOS_{min}$)·func(Rebuf_Num,Rebuf_Len,MultiRebuf_Factor) and the initial media quality that is obtained by calculation. A specific calculation formula of determining the final media quality according to the obtained rebuffering event distortion quality and the initial media quality that is obtained by calculation may be: $Q_v$=Video_Quality−$Q_{rebuf}$, where $Q_v$ represents the final media quality, Video_Quality represents the initial media quality, and $Q_{rebuf}$ represents the rebuffering event distortion quality.

Embodiment 3

Figure 4:
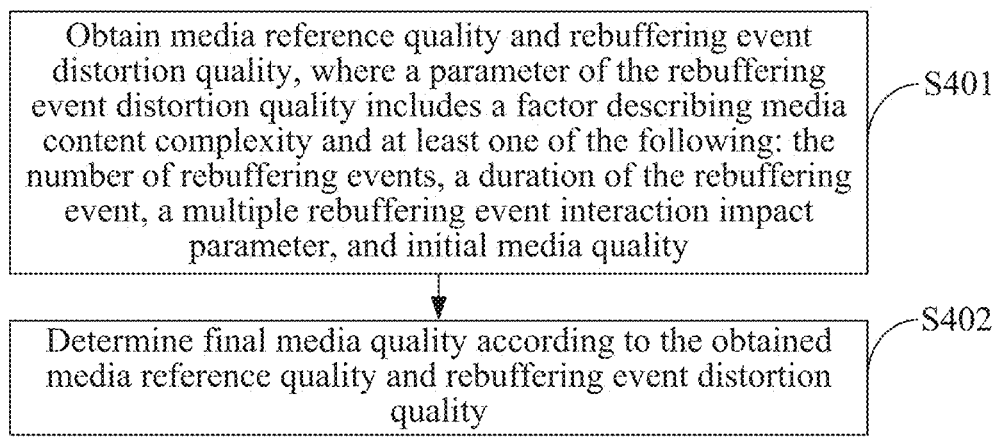
FIG. 4 is a flowchart of implementation of a method for evaluating media quality according to Embodiment 3 of the present invention.

FIG. 4 shows an implementation procedure of a method for evaluating media quality according to Embodiment 3 of the present invention, where a process of the method is described in detail as follows:

In step S401, obtain media reference quality and rebuffering event distortion quality.

When the media reference quality is the same, for a same rebuffering event, media of different content features has different subjective quality. For example, compared with media with a small motion, rebuffering has greater impact on media with a large motion. Therefore, in this embodiment, a parameter of the rebuffering event distortion quality includes initial media quality, the number of rebuffering events, a duration of the rebuffering events, and a factor describing media content complexity, where $Q_{rebuf}$=func(Video_Quality,Rebuf_Num,Rebuf_Len,Complexity_Factor) or $Q_{rebuf}$=Video_Quality−$MOS_{min}$)·func(Rebuf_Len, Rebuf_Num)·func2(Complexity_Factor). Alternatively, the parameter of the rebuffering event distortion quality includes the initial media quality, the number of rebuffering events, the duration of the rebuffering events, a multiple rebuffering event interaction impact parameter, and the factor describing media content complexity, where $Q_{rebuf}$=(Video_Quality−$MOS_{min}$)·func(Rebuf_Len,Rebuf_Num)·func2(Complexity_ Factor) or $Q_{rebuf}$(Video_Quality−$MOS_{min}$)·func(Rebuf_Len,Rebuf_Num,MultiRebuf_Factor)·func2(Complexity_Factor). Alternatively, the parameter of the rebuffering event distortion quality includes the number of rebuffering events, the duration of the rebuffering events, and the factor describing media content complexity, where $Q_{rebuf}$=func(Rebuf_Num,Rebuf_Len,Complxity_ Factor). Alternatively, the parameter of the rebuffering event distortion quality includes the number of rebuffering events, the duration of the rebuffering events, the multiple rebuffering event interaction impact parameter, and the factor describing media content complexity, where $Q_{rebuf}$=func(Rebuf_Num, Rebuf_Len,MultiRebuf_Factor,Complxity_Factor).

In this embodiment, in addition to using rebuffering information (including Rebuf_Num, Rebuf_Len, and MultiRebuf_Factor) and/or the initial media quality in Embodiment 1, the factor describing media content complexity is used in combination to calculate the rebuffering event distortion quality. A greater factor describing media content complexity indicates greater rebuffering event distortion quality.

In this embodiment, the rebuffering event distortion quality is obtained according to the initial media quality, the number of rebuffering events, the duration of the rebuffering events, and the factor describing media content complexity, where a specific calculation formula of the rebuffering event distortion quality may be:

$$Q_{rebuf} = (\text{Video\_Quality} - MOS_{min}) \cdot \frac{\left(\frac{\text{Rebuf\_Len}}{a_1}\right)^{b_1} \cdot \left(\frac{\text{Rebuf\_Num}}{a_2}\right)^{b_2} \cdot \left(\frac{\text{Complexity\_Factor}}{a_3}\right)^{b_3}}{1 + \left(\frac{\text{Rebuf\_Len}}{a_1}\right)^{b_1} \cdot \left(\frac{\text{Rebuf\_Num}}{a_2}\right)^{b_2} \cdot \left(\frac{\text{Complexity\_Factor}}{a_3}\right)^{b_3}}$$

Alternatively, the rebuffering event distortion quality is obtained according to the initial media quality, the number of rebuffering events, the duration of the rebuffering events, the multiple rebuffering event interaction impact parameter, and the factor describing media content complexity, where a specific calculation formula of the rebuffering event distortion quality may be:

$$Q_{rebuf} = (\text{Video\_Quality} - MOS_{min}) \cdot \frac{\left(\frac{\text{Rebuf\_Len}}{a_1}\right)^{b_1} \cdot \left(\frac{\text{Rebuf\_Num}}{a_2}\right)^{b_2} \cdot \left(\frac{\text{MultiRebuf\_Factor}}{a_3}\right)^{b_3} \cdot \left(\frac{\text{Complexity\_Factor}}{a_3}\right)^{b_4}}{1 + \left(\frac{\text{Rebuf\_Len}}{a_1}\right)^{b_1} \cdot \left(\frac{\text{Rebuf\_Num}}{a_2}\right)^{b_2} \cdot \left(\frac{\text{MultiRebuf\_Factor}}{a_3}\right)^{b_3} \cdot \left(\frac{\text{Complexity\_Factor}}{a_3}\right)^{b_4}}$$

where Video_Quality is the initial media quality, $MOS_{min}$ represents lowest media quality, Rebuf_Num represents the number of rebuffering events within a preset time, Rebuf_Len represents a duration for which the rebuffering events last within the preset time, MultiRebuf_Factor represents a weighted average duration of time intervals between rebuffering events within a preset time, Complexity_Factor represents media content complexity within each preset period of time, and $a_1$, $a_2$, $a_3$, $b_1$, $b_2$ are constants.

In step S402, determine final media quality $Q_v$=func($Q_{coding}$,$Q_{rebuf}$) according to the obtained media reference quality and rebuffering event distortion quality.

Embodiment 4

Figure 5:
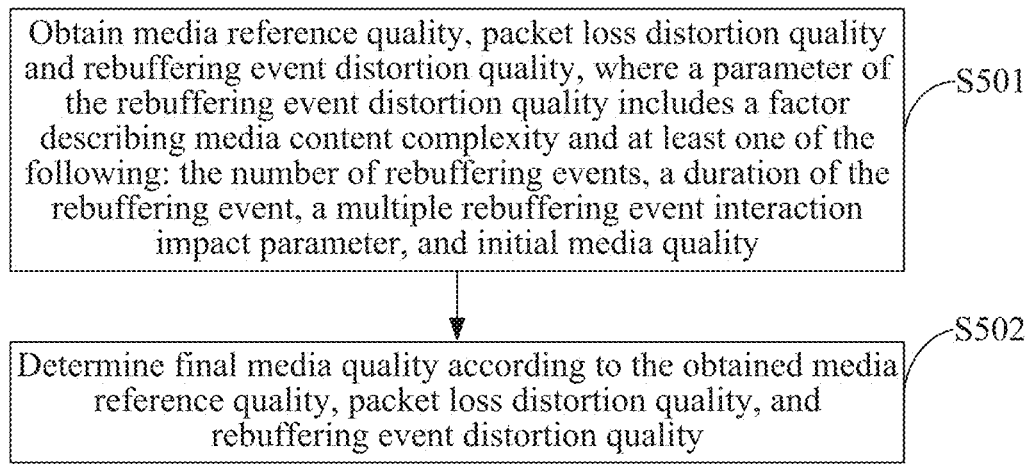
FIG. 5 is a flowchart of implementation of a method for evaluating media quality according to Embodiment 4 of the present invention.

FIG. 5 shows an implementation procedure of a method for evaluating media quality according to Embodiment 4 of the present invention, where a process of the method is described in detail as follows:

In step S501, obtain media reference quality, and obtain packet loss distortion quality and rebuffering event distortion quality.

In this embodiment, the media reference quality and the packet loss distortion quality may be obtained by using the prior art, which is not described in detail again herein. The rebuffering event distortion quality is obtained by using the method in Embodiment 3.

A parameter of the rebuffering event distortion quality includes initial media quality, the number of rebuffering events, a duration of the rebuffering events, and a factor describing media content complexity, where $Q_{rebuf}$=func(Video_Quality,Rebuf_Num,Rebuf_Len,Complexity_Factor) or $Q_{rebuf}$=(Video_Quality−$MOS_{min}$)·func(Rebuf_Len,Rebuf_Num)·func2(Complexity_Factor). Alternatively, the parameter of the rebuffering event distortion quality includes the initial media quality, the number of rebuffering events, the duration of the rebuffering events, a multiple rebuffering event interaction impact parameter, and the factor describing media content complexity, where $Q_{rebuf}$=(Video_Quality−$MOS_{min}$)·func(Rebuf_Len,Rebuf_Num)·func2(Complexity_Factor) or $Q_{rebuf}$=(Video_Quality−$MOS_{min}$)·func(Rebuf_Len,Rebuf_Num,MultiRebuf_Factor)·func2(Complexity_Factor). Alternatively, the parameter of the rebuffering event distortion quality includes the number of rebuffering events, the duration of the rebuffering events, and the factor describing media content complexity, where $Q_{rebuf}$=func(Rebuf_Num,Rebuf_Len,Complexity_Factor). Alternatively, the parameter of the rebuffering event distortion quality includes the number of rebuffering events, the duration of the rebuffering events, the multiple rebuffering event interaction impact parameter, and the factor describing media content complexity, where $Q_{rebuf}$=func(Rebuf_Num,Rebuf_Len,MultiRebuf_Factor,Complexity_Factor).

In other words, the rebuffering event distortion quality may be obtained according to the initial media quality, the number of rebuffering events, the duration of the rebuffering events, and the factor describing media content complexity.

Alternatively, the rebuffering event distortion quality is obtained according to the initial media quality, the number of rebuffering events, the duration of the rebuffering events, the multiple rebuffering event interaction impact parameter, and the factor describing media content complexity.

Alternatively, the rebuffering event distortion quality is obtained according to the number of rebuffering events, the duration of the rebuffering events, and the factor describing media content complexity.

Alternatively, the rebuffering event distortion quality is obtained according to the number of rebuffering events, the duration of the rebuffering events, the multiple rebuffering event interaction impact parameter, and the factor describing media content complexity.

In step S502, determine final media quality $Q_v$=func($Q_{encoding}$,$Q_{pkt\_lost}$,$Q_{rebuf}$) according to the obtained media reference quality, packet loss distortion quality, and rebuffering event distortion quality.

Embodiment 5

Figure 6:
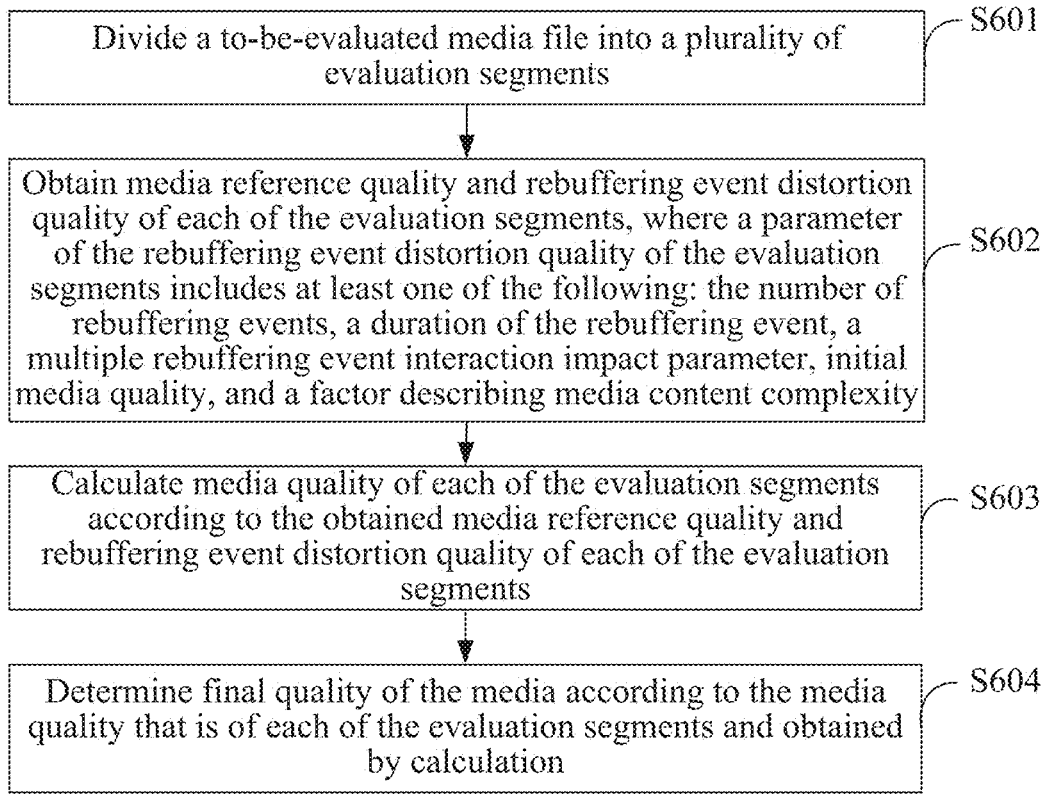
FIG. 6 is a flowchart of implementation of a method for evaluating media quality according to Embodiment 5 of the present invention.

FIG. 6 shows an implementation procedure of a method for evaluating media quality according to Embodiment 5 of the present invention, where a process of the method is described in detail as follows:

In step S601, divide a to-be-evaluated media file into a plurality of evaluation segments.

Preferably, the to-be-evaluated media file is divided into a plurality of evaluation segments according to a rebuffering event or a rebuffering duration.

In step S602, obtain media reference quality and rebuffering event distortion quality of each of the evaluation segments, where a parameter of rebuffering event distortion quality of the evaluation segments includes at least one of the following: the number of rebuffering events, a duration of the rebuffering event, a multiple rebuffering event interaction impact parameter, initial media quality, and a factor describing media content complexity.

In step S603, calculate media quality of each of the evaluation segments according to the obtained media reference quality and rebuffering event distortion quality of each of the evaluation segments.

In this embodiment, the media quality of each evaluation segment may be obtained by using the media quality calculation method according to Embodiment 1, 2, 3, or 4, where $Q_i$=func($Q_{i_{coding}}$,$Q_{i_{rebuf}}$).

In step S604, determine final quality of the media Q=func($Q_i$) according to the media quality that is of each of the evaluation segments and obtained by calculation, where Q represents the final quality of the media, and $Q_i$ represents the media quality of each evaluation segment (a media sequence within a preset period of time).

Specifically, a weight for each evaluation segment is set according to a rebuffering duration of rebuffering events in each evaluation segment, or a weight for each evaluation segment is set according to a rebuffering quality score of each evaluation segment or a rebuffering model effect factor.

A weighting operation is performed on the media quality of each evaluation segment of the media according to the set weight, and a weighted average value obtained after the weighting operation is used as the final quality of the media (for example, Q=$Q_1$×$a_1$+$Q_2$×$a_2$+ . . . +$Q_n$×$a_n$, where $a_i$ represents a weight of an $i^{th}$ evaluation segment). Alternatively, when media quality of N evaluation segments is lower than preset media quality, lowest media quality of the N evaluation segments or average media quality of the N evaluation segments is used as the final quality of the media, where N is an integer greater than or equal to 1.

Embodiment 6

Figure 7:
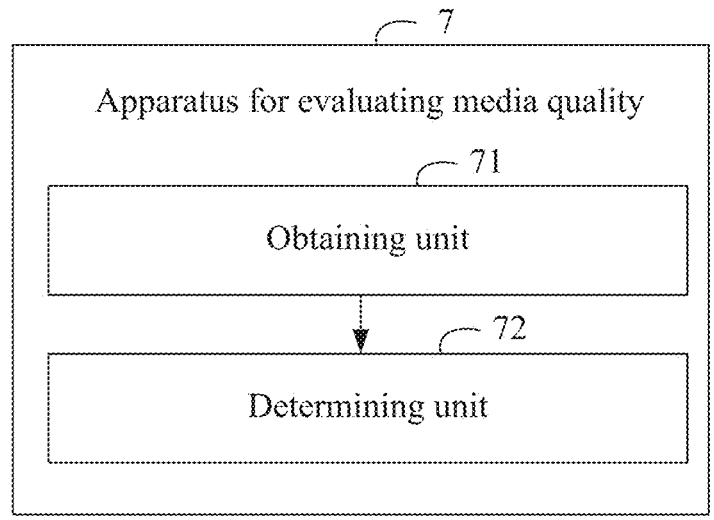
FIG. 7 is a structural diagram of composition of an apparatus for evaluating media quality according to Embodiment 6 of the present invention.

FIG. 7 shows a composition structure of an apparatus for evaluating media quality according to Embodiment 6 of the present invention, and for ease of description, only shows a part related to this embodiment of the present invention.

The apparatus for evaluating media quality may be applied to various information terminals (a television set, a mobile phone, a computer, a personal digital assistant, and the like), may be a software unit, a hardware unit, or a unit combining software and hardware that operates in these terminals, and may also be integrated into these terminals as an independent add-on, or operate in an application system of these terminals.

The apparatus 7 for evaluating media quality includes an obtaining unit 71 and a determining unit 72. Specific functions of the units are as follows:

The obtaining unit 71 is configured to obtain media reference quality and rebuffering event distortion quality.

The determining unit 72 is configured to determine final media quality according to the media reference quality and rebuffering event distortion quality that are obtained by the obtaining unit 71.

A parameter of the rebuffering event distortion quality includes at least one of the following: the number of rebuffering events, a duration of the rebuffering event, a multiple rebuffering event interaction impact parameter, initial media quality, and a factor describing media content complexity.

Further, the obtaining unit 71 is further configured to obtain packet loss distortion quality.

The determining unit 72 is further configured to determine the final media quality according to the media reference quality, the packet loss distortion quality, and the rebuffering event distortion quality that are obtained by the obtaining unit 71.

Further, the determining unit 72 is specifically configured to calculate the initial media quality according to the obtained media reference quality and packet loss distortion quality, and then determine the final media quality according to the obtained rebuffering event distortion quality and the initial media quality that is obtained by calculation.

In this embodiment, the rebuffering event distortion quality is obtained according to the initial media quality, the number of rebuffering events, and the duration of the rebuffering events, or the rebuffering event distortion quality is obtained according to the initial media quality, the number of rebuffering events, the duration of the rebuffering events, and the multiple rebuffering event interaction impact parameter.

Alternatively, the rebuffering event distortion quality is obtained according to the initial media quality, the number of rebuffering events, the duration of the rebuffering events, and the factor describing media content complexity. Alternatively, the rebuffering event distortion quality is obtained according to the initial media quality, the number of rebuffering events, the duration of the rebuffering events, the multiple rebuffering event interaction impact parameter, and the factor describing media content complexity. Alternatively, the rebuffering event distortion quality is obtained according to the number of rebuffering events, the duration of the rebuffering events, and the factor describing media content complexity. Alternatively, the rebuffering event distortion quality is obtained according to the number of rebuffering events, the duration of the rebuffering events, the multiple rebuffering event interaction impact parameter, and the factor describing media content complexity.

The duration of the rebuffering events is a weighted average duration of the rebuffering events within a preset time, where the weighted average duration of the rebuffering events within the preset time is obtained according to a duration for which a rebuffering event lasts within the preset time and a weighting coefficient of the rebuffering event. Alternatively, the duration of the rebuffering events is a ratio of a total duration for which the rebuffering events last within the preset time to the preset time. Alternatively, the duration of the rebuffering events is the total duration for which the rebuffering events last within the preset time.

The multiple rebuffering event interaction impact parameter is a weighted average duration of time intervals between rebuffering events within a preset time, where the weighted average duration of the time intervals between the rebuffering events within the preset time is obtained according to a time interval between a rebuffering event and a previous rebuffering event of the rebuffering event within the preset time and a weighting coefficient of the rebuffering event.

The weighting coefficient is set according to a length of a time interval between rebuffering events or according to the number of times of a same rebuffering interval.

The apparatus for evaluating media quality provided in this embodiment can be used for the foregoing corresponding methods for evaluating media quality, and for details, refer to related description in Embodiment 1, 2, 3, and 4 of the foregoing methods for evaluating media quality, which are not described in detail again herein.

Embodiment 7

Figure 8:
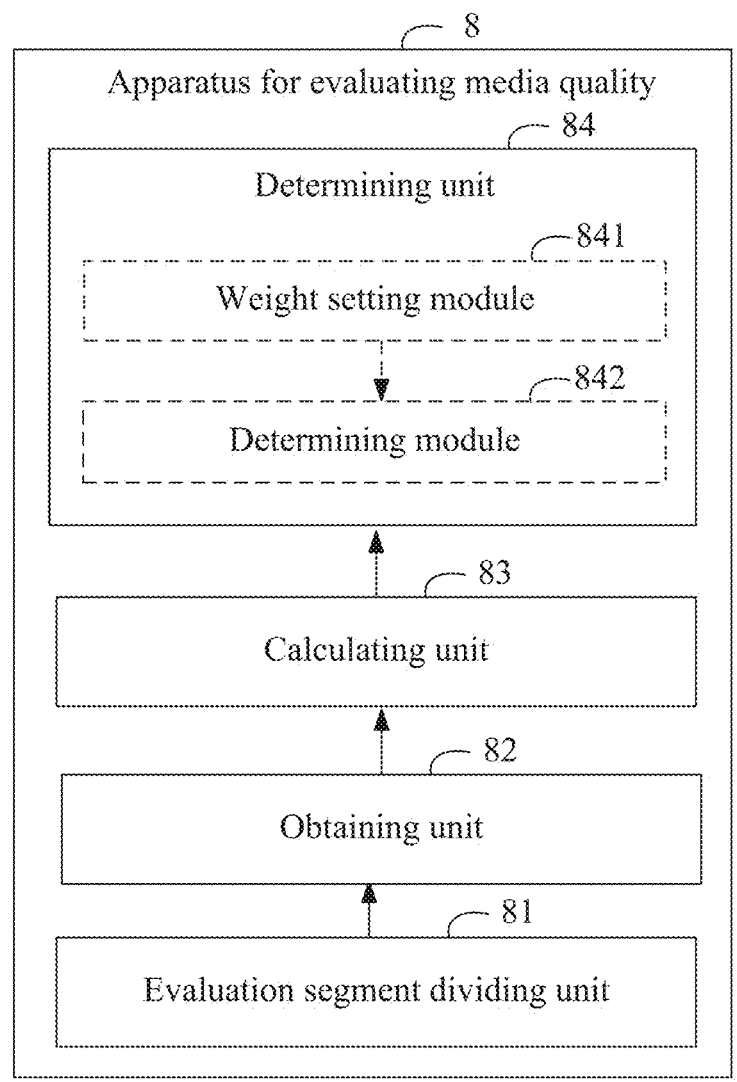
FIG. 8 is a structural diagram of composition of an apparatus for evaluating media quality according to Embodiment 7 of the present invention.

FIG. 8 shows a composition structure of an apparatus for evaluating media quality according to Embodiment 7 of the present invention, and for ease of description, only shows a part related to this embodiment of the present invention.

The apparatus for evaluating media quality may be applied to various information terminals (a television set, a mobile phone, a computer, a personal digital assistant, and the like), may be a software unit, a hardware unit, or a unit combining software and hardware that operates in these terminals, and may also be integrated into these terminals as an independent add-on, or operate in an application system of these terminals.

The apparatus 8 for evaluating media quality includes an evaluation segment dividing unit 81, an obtaining unit 82, a calculating unit 83, and a determining unit 84. Specific functions of the units are as follows:

The evaluation segment dividing unit 81 is configured to divide a to-be-evaluated media file into a plurality of evaluation segments.

The obtaining unit 82 is configured to obtain media reference quality and rebuffering event distortion quality of each of the evaluation segments that is obtained by dividing by the evaluation segment dividing unit 81, where a parameter of rebuffering event distortion quality of the evaluation segments includes at least one of the following: the number of rebuffering events, a duration of the rebuffering event, a multiple rebuffering event interaction impact parameter, initial media quality, and a factor describing media content complexity.

The calculating unit 83 is configured to calculate media quality of each of the evaluation segments that is obtained by dividing by the evaluation segment dividing unit 81 according to the media reference quality and the rebuffering event distortion quality that are of each of the evaluation segments and obtained by the obtaining unit 82.

The determining unit 84 is configured to determine final quality of the media according to the media quality that is of each of the evaluation segments and is obtained by calculating by the calculating unit 83.

Further, the evaluation segment dividing unit 81 is specifically configured to divide the to-be-evaluated media file into the plurality of evaluation segments according to a rebuffering event or a rebuffering duration.

The determining unit 84 includes:

a weight setting module 841, configured to set a weight for each evaluation segment according to a rebuffering duration of rebuffering events in each evaluation segment, or set a weight for each evaluation segment according to a rebuffering quality score of each evaluation segment or a rebuffering model effect factor; and a determining module 842, configured to perform a weighting operation on the media quality of each evaluation segment of the media according to the weight set by the weight setting module 841, and use a weighted average value obtained after the weighting operation as the final quality of the media.

Preferably, when media quality of N evaluation segments is lower than preset media quality, the determining unit 84 is configured to use lowest media quality of the N evaluation segments or average media quality of the N evaluation segments as the final quality of the media, where N is greater than or equal to 1.

The apparatus for evaluating media quality provided in this embodiment can be used for the foregoing corresponding method for evaluating media quality, and for details, refer to related description in Embodiment 5 of the foregoing method for evaluating media quality, which is not described in detail again herein.

A person of ordinary skill in the art may understand that classification of units and modules included in Embodiment 6 and Embodiment 7 is merely logical function classification, but the present invention is not limited to the above classification as long as corresponding functions can be implemented. In addition, the specific names of all functional units and modules are merely for facilitating the differentiation between each other, but are not intended to limit the protection scope of the present invention.

In conclusion, in the embodiments of the present invention, when media quality is calculated, impact of a multiple rebuffering event interaction impact parameter, initial media quality, and a factor describing media content complexity on the media quality is considered, thereby making a media quality evaluation result more accurate, and more consistent with subjective feelings of people.

A person of ordinary skill in the art may understand that all or a part of the steps of the methods in the embodiments may be implemented by a program instructing relevant hardware. The program may be stored in a computer readable storage medium, including a ROM, a RAM, a magnetic disk, or an optical disc.

The foregoing descriptions are merely exemplary embodiments of the present invention, but are not intended to limit the present invention. Any modification, equivalent replacement, or improvement made without departing from the spirit and principle of the present invention should fall within the protection scope of the present invention.

What is claimed is:

1. A method for evaluating media quality performed by a terminal having a processor, wherein the method comprises:
    obtaining media reference quality, packet loss distortion quality, and rebuffering event distortion quality; and
    determining final media quality by using the obtained media reference quality, packet loss distortion quality, and the rebuffering event distortion quality;
    wherein a parameter of the rebuffering event distortion quality comprises at least one of the following: the number of rebuffering events, a duration of the rebuffering event, a multiple rebuffering event interaction impact parameter, initial media quality, and a factor describing media content complexity;
    wherein the determining final media quality according to the obtained media reference quality, packet loss distortion quality, and rebuffering even distortion quality comprises: calculating the initial media quality according to the obtained media reference quality and packet loss distortion quality, and then determining the final media quality according to the obtained rebuffering event distortion quality and the initial media quality that is obtained by calculation.

2. The method according to claim 1, wherein the rebuffering event distortion quality is obtained according to the initial media quality, the number of rebuffering events, and the duration of the rebuffering events; or
    the rebuffering event distortion quality is obtained according to the initial media quality, the number of rebuffering events, the duration of the rebuffering events, and the multiple rebuffering event interaction impact parameter; or
    the rebuffering event distortion quality is obtained according to the initial media quality, the number of rebuffering events, the duration of the rebuffering events, and the factor describing media content complexity; or
    the rebuffering event distortion quality is obtained according to the initial media quality, the number of rebuffering events, the duration of the rebuffering events, the multiple rebuffering event interaction impact parameter, and the factor describing media content complexity; or
    the rebuffering event distortion quality is obtained according to the number of rebuffering events, the duration of the rebuffering events, and the factor describing media content complexity; or
    the rebuffering event distortion quality is obtained according to the number of rebuffering events, the duration of the rebuffering events, the multiple rebuffering event interaction impact parameter, and the factor describing media content complexity.

3. The method according to claim 2, wherein the duration of the rebuffering events is a weighted average duration of the rebuffering events within a preset time, wherein the weighted average duration of the rebuffering events within the preset time is obtained according to a duration for which a rebuffering event lasts within the preset time and a weighting coefficient of the rebuffering event; or
    the duration of the rebuffering events is a ratio of a total duration for which the rebuffering events last within a preset time to the preset time; or
    the duration of the rebuffering events is a total duration for which the rebuffering events last within a preset time.

4. The method according to claim 2, wherein the multiple rebuffering event interaction impact parameter is a weighted average duration of time intervals between rebuffering events within a preset time, wherein the weighted average duration of the time intervals between the rebuffering events within the preset time is obtained according to a time interval between a rebuffering event and a previous rebuffering event of the rebuffering event within the preset time and a weighting coefficient of the rebuffering event.

5. The method according to claim 3, wherein the weighting coefficient is set according to a length of a time interval between rebuffering events or according to the number of times of a same rebuffering interval.

6. An apparatus for evaluating media quality comprising:
    a processor; and
    a computer readable storage medium storing computer executable instructions, the processor being configured to execute the computer executable instructions to:
        obtain media reference quality, packet loss distortion quality, and rebuffering event distortion quality; and determine final media quality according to the obtained media reference quality, packet loss distortion quality, and rebuffering event distortion quality;

wherein a parameter of the rebuffering event distortion quality comprises at least one of the following: the number of rebuffering events, a duration of the rebuffering event, a multiple rebuffering event interaction impact parameter, initial media quality, and a factor describing media content complexity;

wherein the processor being configured to execute the computer executable instructions to: calculate the initial media quality according to the obtained media reference quality and packet loss distortion quality, and then determine the final media quality according to the obtained rebuffering event distortion quality and the initial media quality that is obtained by calculation.

7. The apparatus according to claim 6, wherein the rebuffering event distortion quality is obtained according to the initial media quality, the number of rebuffering events, and the duration of the rebuffering events; or the rebuffering event distortion quality is obtained according to the initial media quality, the number of rebuffering events, the duration of the rebuffering events, and the multiple rebuffering event interaction impact parameter; or the rebuffering event distortion quality is obtained according to the initial media quality, the number of rebuffering events, the duration of the rebuffering events, and the factor describing media content complexity; or the rebuffering event distortion quality is obtained according to the initial media quality, the number of rebuffering events, the duration of the rebuffering events, the multiple rebuffering event interaction impact parameter, and the factor describing media content complexity; or the rebuffering event distortion quality is obtained according to the number of rebuffering events, the duration of the rebuffering events, and the factor describing media content complexity; or the rebuffering event distortion quality is obtained according to the number of rebuffering events, the duration of the rebuffering events, the multiple rebuffering event interaction impact parameter, and the factor describing media content complexity.

8. The apparatus according to claim 7, wherein the duration of the rebuffering events is a weighted average duration of the rebuffering events within a preset time, wherein the weighted average duration of the rebuffering events within the preset time is obtained according to a duration for which a rebuffering event lasts within the preset time and a weighting coefficient of the rebuffering event; or the duration of the rebuffering events is a ratio of a total duration for which the rebuffering events last within a preset time to the preset time; or the duration of the rebuffering events is a total duration for which the rebuffering events last within a preset time.

9. The apparatus according to claim 7, wherein the multiple rebuffering event interaction impact parameter is a weighted average duration of time intervals between rebuffering events within a preset time, wherein the weighted average duration of the time intervals between the rebuffering events within the preset time is obtained according to a time interval between a rebuffering event and a previous rebuffering event of the rebuffering event within the preset time and a weighting coefficient of the rebuffering event.

10. The apparatus according to claim 9, wherein the weighting coefficient is set according to a length of a time interval between rebuffering events or according to the number of times of a same rebuffering interval.

11. An apparatus for evaluating media quality comprising:
a processor; and
a computer readable storage medium storing computer executable instructions, the processor being configured to execute the computer executable instructions to:
divide a to-be-evaluated media file into a plurality of evaluation segments;
obtain media reference quality and rebuffering event distortion quality of each of the evaluation segments, wherein a parameter of rebuffering event distortion quality of the evaluation segments comprises at least one of the following: the number of rebuffering events, a duration of the rebuffering event, a multiple rebuffering event interaction impact parameter, initial media quality; and a factor describing media content complexity;
calculate media quality of each of the evaluation segments according to the obtained media reference quality and rebuffering event distortion quality of each of the evaluation segments;
determine final quality of the media the according to the media quality that is of each of the evaluation segments and obtained by calculation;
set a weight for each evaluation segment according to a rebuffering duration of rebuffering events in each evaluation segment, or set a weight for each evaluation segment according to a rebuffering quality score of each evaluation segment or a rebuffering model effect factor; and
perform a weighting operation on the media quality of each evaluation segment of the media file according to the set weight, and use a weighted average value obtained after the weighting operation as the final quality of the media file.

12. The apparatus according to claim 11, wherein the processor being configured to execute the computer executable instructions to: divide the to-be-evaluated media file into a plurality of evaluation segments according to a rebuffering event or a rebuffering duration.

13. The apparatus according to claim 11, wherein when media quality of N evaluation segments is lower than preset media quality, the determining unit is configured to use lowest media quality of the N evaluation segments or average media quality of the N evaluation segments as the final quality of the media file, wherein N is greater than or equal to 1.

* * * * *

UNITED STATES PATENT AND TRADEMARK OFFICE
CERTIFICATE OF CORRECTION

PATENT NO. : 9,654,770 B2
APPLICATION NO. : 14/518164
DATED : May 16, 2017
INVENTOR(S) : Shan Gao Page 1 of 1

It is certified that error appears in the above-identified patent and that said Letters Patent is hereby corrected as shown below:

In the Claims

In Column 15, Line 66, Claim 1, delete "rebuffering even distortion" and insert --rebuffering event distortion--.

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*